(12) United States Patent
Suissa

(10) Patent No.: US 9,592,715 B2
(45) Date of Patent: Mar. 14, 2017

(54) METHOD AND APPARATUS FOR ACTIVE DYNAMIC TRIMMING OF SUSPENSION DAMPING INCLUDING NEGATIVE STIFFNESS

(71) Applicant: GM GLOBAL TECHNOLOGY OPERATIONS LLC, Detroit, MI (US)

(72) Inventor: Avshalom Suissa, Kiryat Ono (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 32 days.

(21) Appl. No.: 14/724,045

(22) Filed: May 28, 2015

(65) Prior Publication Data

US 2016/0347144 A1    Dec. 1, 2016

(51) Int. Cl.
*B60G 17/0165* (2006.01)
*B60G 15/06* (2006.01)
*B60G 17/00* (2006.01)

(52) U.S. Cl.
CPC ......... *B60G 17/0165* (2013.01); *B60G 15/06* (2013.01); *B60G 17/00* (2013.01); *B60G 2200/142* (2013.01); *B60G 2202/30* (2013.01); *B60G 2204/62* (2013.01); *B60G 2600/182* (2013.01); *B60G 2800/91* (2013.01)

(58) Field of Classification Search
CPC .... B60G 17/0165; B60G 15/06; B60G 17/00; B60G 2800/91; B60G 2202/30; B60G 2204/62; B60G 2600/182; B60G 2200/142
See application file for complete search history.

(56) References Cited

U.S. PATENT DOCUMENTS

| | | | | |
|---|---|---|---|---|
| 4,583,752 A | * | 4/1986 | Breitbach | B60G 11/32 280/124.165 |
| 4,710,656 A | * | 12/1987 | Studer | F16F 15/03 188/267 |
| 2014/0265077 A1 | * | 9/2014 | Hinks | F16F 3/10 267/151 |
| 2015/0165852 A1 | * | 6/2015 | Suissa | B60G 11/56 280/124.106 |
| 2015/0165858 A1 | * | 6/2015 | Suissa | B60G 17/048 280/5.515 |
| 2015/0167770 A1 | * | 6/2015 | Trangbaek | F16F 6/005 280/5.508 |

OTHER PUBLICATIONS

U.S. Appl. No. 14/106,963, filed Dec. 16, 2013, Avshalom Suissa.
U.S. Appl. No. 14/106,945, filed Dec. 16, 2013, Avshalom Suissa.

* cited by examiner

*Primary Examiner* — Anne M Antonucci

(57) ABSTRACT

A suspension assembly between a sprung element and an unsprung element includes a load-carrying spring and a negative stiffness element between the sprung element and the unsprung element. The load-carrying spring element is configured with a positive spring rate to support a static load of the sprung element. The negative stiffness element is configured with a negative spring rate and is configured to exert a force opposing the spring rate of the spring, the negative spring rate has a magnitude that cancels the positive spring rate at a zero deflection point of the suspension assembly. The suspension assembly also includes an active trimming mechanism which is configured to move a plurality of pivot points of the negative stiffness element to achieve a trimmed position of the negative stiffness element.

20 Claims, 3 Drawing Sheets

METHOD AND APPARATUS FOR ACTIVE DYNAMIC TRIMMING OF SUSPENSION DAMPING INCLUDING NEGATIVE STIFFNESS

TECHNICAL FIELD

This disclosure relates to devices for damping vibration between a sprung element and an unsprung element employing active elements.

BACKGROUND

The statements in this section merely provide background information related to the present disclosure. Accordingly, such statements are not intended to constitute an admission of prior art.

Suspension systems are employed to decouple a sprung element from impulse and vibration energy inputs that are experienced at an unsprung element by absorbing and dissipating vibration inputs. Suspension systems are employed on both stationary systems and mobile systems including passenger vehicles. Known suspension system elements include spring elements coupled in parallel and/or in series with damping elements, e.g., shock absorbers that include fluidic or pneumatic energy absorbing and dissipating features.

When employed on a vehicle system, suspension systems including springs and dampers are configured to coincidently provide performance characteristics related to passenger ride comfort, vehicle handling and road holding capability. Ride comfort is generally managed in relation to spring constant of the main springs of the vehicle, spring constant of passenger seating, tires and a damping coefficient of the damper. For optimum ride comfort, a relatively low damping force for a soft ride is preferred. Vehicle handling relates to variation in a vehicle's attitude, which is defined in terms of roll, pitch and yaw. For optimum vehicle handling, relatively large damping forces or a firm ride are required to avoid excessively rapid variations in vehicle attitude during cornering, acceleration and deceleration. Road holding ability generally relates to an amount of contact between the tires and the ground. To optimize road handling ability, large damping forces are required when driving on irregular surfaces to prevent loss of contact between individual wheels and the ground. Accordingly, in known passive suspension systems there is a fundamental tradeoff between ride and handling.

Known vehicle suspension dampers employ various methods to adjust damping characteristics to be responsive to changes in vehicle operational characteristics, including active damping systems. Active vehicle suspension systems employ actuators that control various suspension parameters to dynamically adjust one or more of passenger ride comfort, vehicle handling and road holding capability during vehicle operation in response to operating conditions. Such actuators are controlled by hydraulic, pneumatic, or other power sources that can consume on-vehicle power. A high amount of energy is required to change the spring and damper forces of the passive elements to achieve isolation and ride performance.

SUMMARY

A suspension assembly between a sprung element and an unsprung element includes a load-carrying spring and a negative stiffness element between the sprung element and the unsprung element. The load-carrying spring element is configured with a positive spring rate to support a static load of the sprung element. The negative stiffness element is configured with a negative spring rate and is configured to exert a force opposing the spring rate of the spring, the negative spring rate has a magnitude that cancels the positive spring rate at a zero deflection point of the suspension assembly. The suspension assembly also includes an active trimming mechanism which is configured to move a plurality of pivot points of the negative stiffness element to achieve a trimmed position of the negative stiffness element.

BRIEF DESCRIPTION OF THE DRAWINGS

One or more embodiments will now be described, by way of example, with reference to the accompanying drawings, in which:

FIG. 8 graphically depicts the heave, roll and pitch during braking of a vehicle having passive suspension with no negative stiffness element, a vehicle having passive suspension with a negative stiffness element without active trimming, and a vehicle having passive suspension with a negative stiffness element and active trimming, in accordance with the disclosure; and FIG. 9 graphically depicts trimming control simulation results of an active dynamic trimming system using closed loop control with a 5 Hz actuator, in accordance with the disclosure.

DETAILED DESCRIPTION

Figure 1:
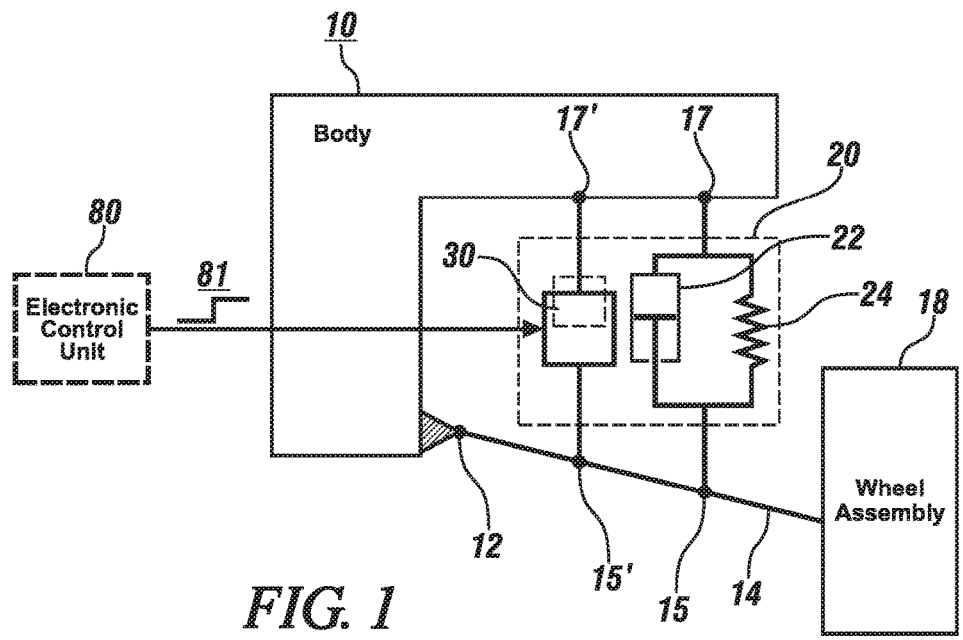
FIG. 1 illustrates a passive suspension assembly including a negative stiffness element that is employed to dampen vibration between a sprung element and an unsprung element, in accordance with the disclosure.

Referring now to the drawings, wherein the showings are for the purpose of illustrating certain exemplary embodiments only and not for the purpose of limiting the same, FIG. 1 illustrates a passive suspension assembly 20 including a negative stiffness element 30 that is employed to dampen vibration between a sprung element and an unsprung element. As shown, the sprung element is a body 10 of a vehicle and the unsprung element includes a lower control arm 14 supporting a wheel assembly 18 that contacts a ground surface. The lower control arm 14 attaches to the body 10 at hinge point 12, and works in concert with an upper control arm to provide seating elements for mounting the wheel assembly 18. Details for mounting a vehicle wheel assembly 18 are known and thus not described herein. The suspension assembly 20 may be employed to dampen vibration between a sprung element and an unsprung element in a stationary setting with similar effect. The suspension assembly 20 incorporates the negative stiffness element 30 to maintain preferred performance while accommodating static and dynamic load changes, including supporting a large load in conjunction with a low dynamic stiffness to isolate vibrations. This enables reduction of the total spring rate to at or near zero while maintaining static load carrying capability. Such a system provides desirable ride performance for passenger comfort and wheel/tire road grip for safety while accommodating static load changes due to mass changes and accommodating dynamic load changes during handling maneuvers. The terms spring rate, spring constant and stiffness are analogous terms that all refer to a change in force exerted by a spring in relation to the deflection of the spring.

The suspension assembly 20 is a load-carrying element that supports and transfers static and dynamic forces and load inputs between the unsprung element 14 and the sprung element 10, i.e., the lower control arm 14 and the body 10. The suspension assembly 20 in the embodiment shown includes a spring 24, a damper 22, and negative stiffness element 30 arranged in parallel between the lower control arm 14 and the body 10. As shown, the spring 24 and damper 22 co-terminate on the lower control arm 14 at hinge point 15 and co-terminate on the body at hinge point 17. The negative stiffness element 30 terminates on the lower control arm 14 at hinge point 15' and terminates on the body at hinge point 17'. As shown and in one embodiment, the hinge point 15 and the hinge point 15' are different points, resulting in different moment arms for the forces exerted by the different elements. Alternatively, the hinge point 15 and the hinge point 15' are the same point. Similarly, as shown and in one embodiment, the hinge point 17 and the hinge point 17' are different points. Alternatively, the hinge point 17 and the hinge point 17' are the same point. In one embodiment, the suspension assembly 20 is a passive suspension system, which is defined as a suspension system that has no external control elements controlling operation of suspension devices, i.e., the spring 24, damper 22 and negative stiffness element 30. The spring 24 and damper 22 are illustrated as mechanical devices, but may be configured as any suitable spring and damper devices, including by way of example, pneumatic devices, hydraulic devices, mechanical devices and combinations thereof. The spring 24, damper 22 and negative stiffness element 30 dampen and otherwise accommodate vibrations input to the unsprung element 14, e.g., the lower control arm 14 supporting the vehicle wheel assembly 18 in contact with the ground surface while the vehicle is moving and while the vehicle is stationary. The suspension system 20 is configured to statically support a large load with a low dynamic stiffness that effects vibration isolation. Preferably the total spring rate of the combined elements of the suspension system 20 is at or near zero around a zero deflection point. Preferably the total spring rate of the combined elements of the suspension system 20 is at or near zero under static conditions responsive to variations in static vehicle loading and is responsive to dynamic load changes associated with vehicle handling, cornering and rough road conditions.

The function of the negative stiffness element 30 is to introduce a force in the suspension assembly 20 between the sprung element 10 and the unsprung element 14 that is counter to the force introduced by the spring 24, e.g., into the suspension of the vehicle under static conditions. The counter force of the negative stiffness element 30 assists in separating the sprung element 10 and the unsprung element 14, so long as the force acting on the sprung element 10 is less than a yield force of the negative stiffness element 30 taking into account any differences in the moment arms of the relevant elements. The negative stiffness element 30 provides a force that is counter to the spring force of the spring 24 and preferably has a negative spring rate at a magnitude that partially or fully cancels the positive spring rate of spring 24 at a zero deflection point of the suspension assembly 20 under static loading.

This exemplary system may additionally include an electronic control unit 80 which can operate to control the negative stiffness element 30. A control signal 81 may be generated by electronic control unit 80 in commanding the negative stiffness element 30.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 100 microseconds, 3.125, 6.25, 12.5, 25 and 100 milliseconds during ongoing engine and vehicle operation. Alternatively, routines may be executed in response to occurrence of an event.

The exemplary embodiment of FIG. 1 enables reduction of a total spring rate to up to zero while maintaining static load carrying capability. This permits for production of good vibration isolation, resulting in a comfortable ride, however it is sensitive to static load changes due to mass changes and dynamic load changes due to handling maneuvers. Static load changes may cause the negative stiffness element 30 to be untrimmed with the positive stiffness and in the case of a negative stiffness element 30 with a progressive characteristic it may affect the vibration isolation quality. Incorporation of an active fast dynamic trimming mechanism to the negative stiffness element based system may overcome the effect of load changes on the trim of the negative stiffness element.

Figure 2:
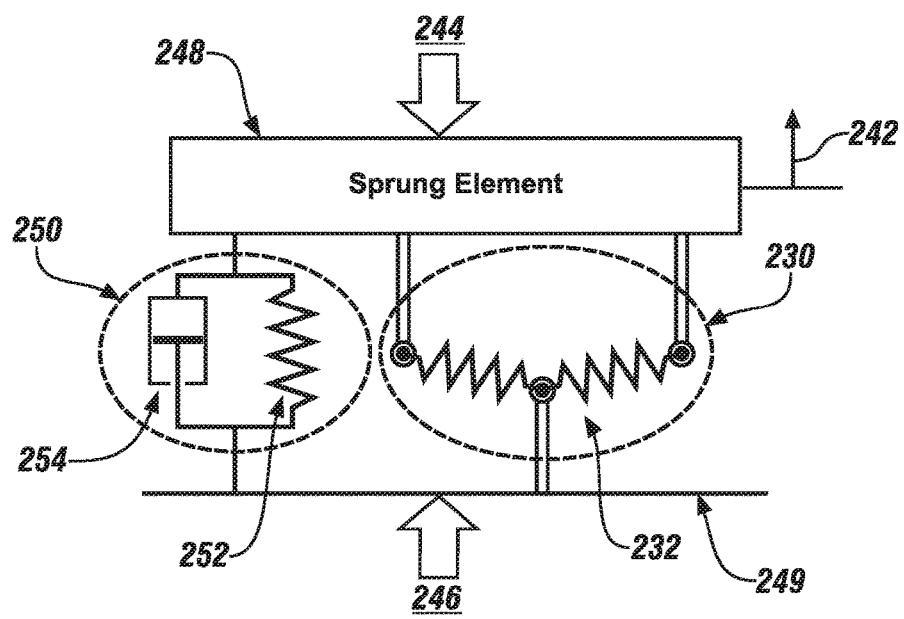
FIG. 2 illustrates a passive suspension assembly including a negative stiffness element that is employed to dampen vibration between a sprung element and an unsprung element under a load, in accordance with the disclosure.

FIG. 2 illustrates the passive suspension assembly of FIG. 1 including a negative stiffness element 230 that is employed to dampen vibration between a sprung element 248 and an unsprung element 249 under a load 244. In this exemplary embodiment the negative stiffness element 230 is a negative spring device 232 and is in parallel to standard suspension 250 which includes a positive spring 252 and a damper 254. While this exemplary embodiment provides vibration isolation using negative stiffness element 230, it is sensitive to load changes, both static and dynamic, on the payload 248. Load 244 applied to payload 248 and ground excitation 246 causes a deflection 242 of the payload 248 and reduces vibration isolation performance in the case of negative stiffness with a progressive stiffness characteristic. The load 244 and the positive spring 252 are not in equilibrium, resulting in the negative stiffness element 230 having a force component.

Figure 3:
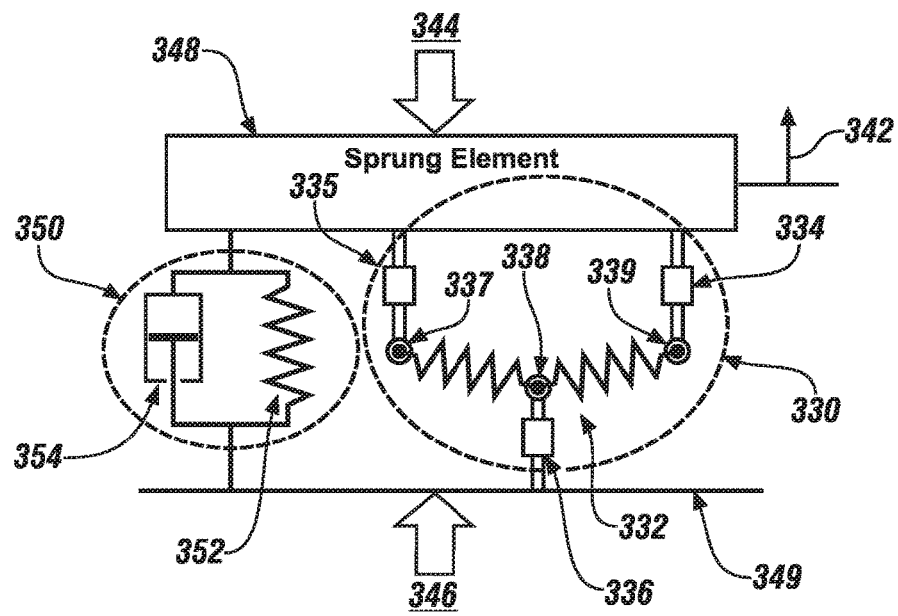
FIG. 3 illustrates the passive suspension assembly of FIG. 2 including a negative stiffness element that is employed to dampen vibration between a sprung element and an unsprung element under a load and further including an active trimming mechanism, in accordance with the disclosure.

FIG. 3 illustrates the passive suspension assembly of FIG. 2 including a negative stiffness element 330 that is employed to dampen vibration between a sprung element 348 and an unsprung element 349 under a load 344 and further including an active trimming mechanism. In this exemplary embodiment the negative stiffness element 330 is a negative spring device 332 and is in parallel to standard suspension 350 which includes a positive spring 352 and a damper 354. The active trimming mechanism includes actuators 334, 335 and 336. FIG. 3 illustrates exemplary positions for a trimming actuator configured to trim the negative stiffness element 330 relative to the standard suspension by moving the pivot points 337, 338, 339 with actuators 334, 335 and 336. Pivot points 337, 338 and 339 can be adjusted back to a trimmed position such that the negative spring device 332 of negative stiffness element 330 is not imparting any force component on the suspension. By using a fast trimming actuation the system can provide the advantages of a fully active suspension system using much less energy consumption.

An exemplary method of active dynamic trimming of a negative stiffness based suspension system may use a set of sensors for estimating or calculating the static and dynamic external forces acting on the payload and by means of a model. A control module can estimate or calculate the static or dynamic external forces acting on the payload and by means of a model may calculate a desired trimming state which is provided as a feed forward command to a trimming control system which generates a command signal to an actuator in order to provide vibration isolation independent from the external forces acting on the payload. For ground excitation the negative stiffness element having active dynamic trimming can behave as a soft spring passive configuration and for body excitation the negative stiffness element having active dynamic trimming can behave as a hard spring passive configuration. The use of negative stiffness elements in passive suspensions may provide adequate vibration isolation performance without the need for active dynamic trimming actuation. Active dynamic trimming actuation can be utilized in all known varieties of implementation of the negative stiffness core technology including spring and hinges, buckling beam, hydraulic, magnetics and bellows. In an exemplary embodiment where the active dynamic trimming actuation is being implemented in vehicle suspension, the anti-roll bar may be removed to reduce weight and cost and to improve behavior in straight drive. Active dynamic trimming actuation of a negative stiffness element may be implemented in a range of products including automotive suspension motor mount. Active dynamic trimming actuation of a negative stiffness element may be implemented in any system of transportation, including airborne and maritime, that is subject to changes of payload weights or other external forces acting on the payload. Any method of actuation including electric and hydraulic may be used for the trimming.

Figure 4:
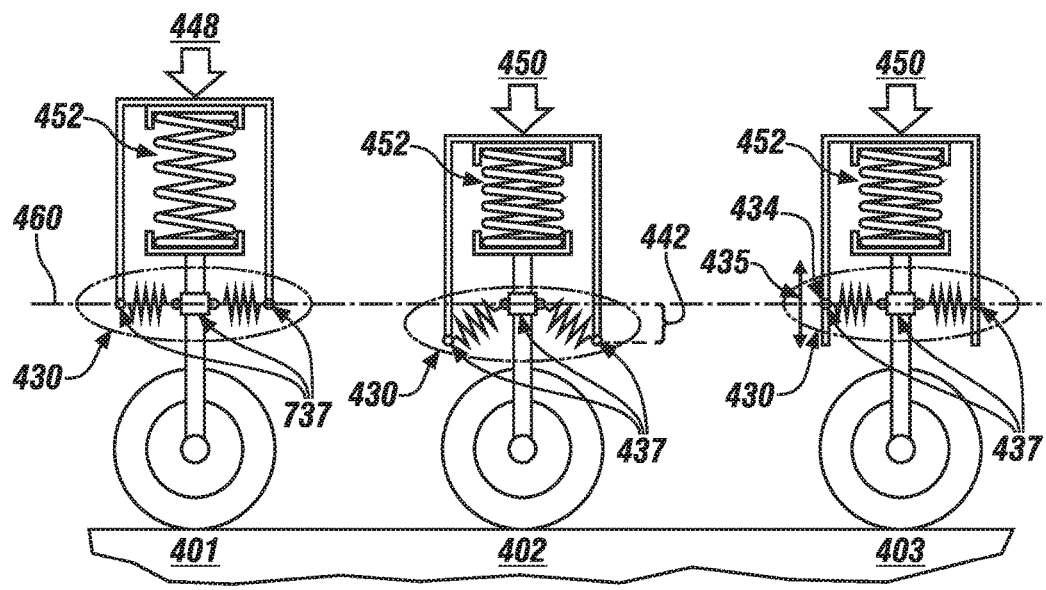
FIG. 4 illustrates a suspension system including negative stiffness element and an active trimming mechanism during stages of deflection resulting from a load change, in accordance with the disclosure.

FIG. 4 illustrates a suspension system including negative stiffness element 430 and an active trimming mechanism 434 during stages of deflection resulting from a load change. At stage 401 the load 448 and the positive spring 452 are in equilibrium. The negative stiffness element 430 has no force component in the strut direction. At stage 402 load 450 is increased due to static or dynamic load changes. At this stage the load 450 and the positive spring 452 are not in equilibrium. The negative stiffness element 430 has a force component in the strut direction as the negative stiffness element exhibits deflection 442 from the trim line 460. At stage 403 increased load 450 remains. An actuator of active trimming mechanism 434 can be actuated to move pivot points 437 of negative stiffness element 430 such that the negative stiffness element 430 is brought to a new trimmed position, the active trimming mechanism 434 moving the pivot points 437 in a vertical range 435, such that the negative stiffness element 430 has no force component in the strut direction. The embodiment of the suspension in FIG. 4 is exemplary and any embodiment of negative stiffness element and suspension may be used with active dynamic trimming.

Figure 5:
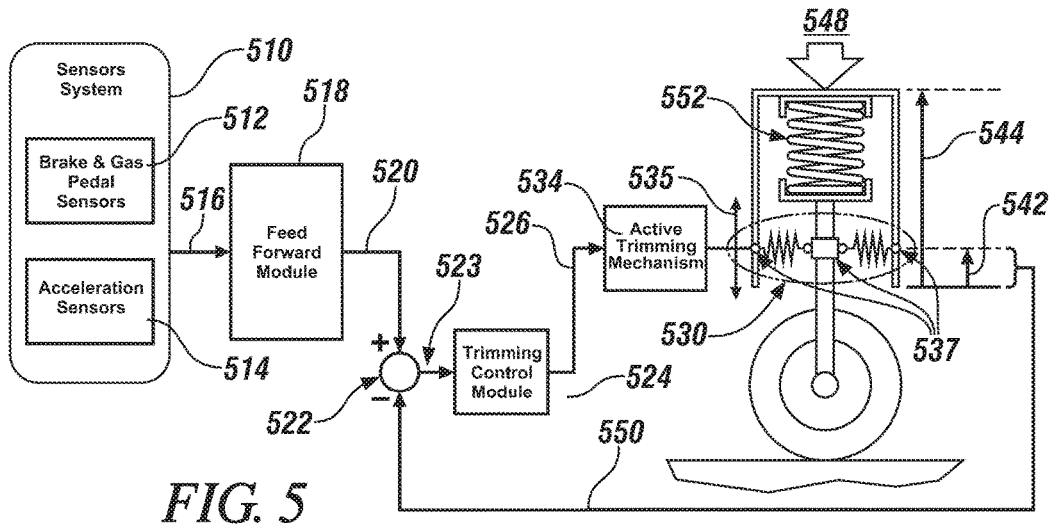
FIG. 5 illustrates an exemplary control system including feed forward control of an active trimming mechanism 534 in a suspension system having active dynamic trimming, in accordance with the disclosure.

FIG. 5 illustrates an exemplary control system including feed forward control of an active trimming mechanism 534 in a suspension system having active dynamic trimming. The suspension system includes positive spring 552 and negative stiffness element 530 under a load 548. Load 548 has caused actual suspension deflection 544. Sensor system 510 includes brake and gas pedal sensors 512 as well as acceleration sensors 514. Sensors of sensor system 510 may include any sensors known in the art. Sensor system 510 may additionally include any sensors indicative of vehicle operating parameters. The sensor system outputs sensor measurements 516 from sensors 512 and 514 to feed forward module 518. The exemplary control system may include a control module for the active trimming mechanism 534. The control module may comprise a feed forward module 518 and a trimming control module 524. Feed forward module 518 and trimming control module 524 may also be independent electronic control modules. Feed forward module 518 includes a model which gives the relation between brake and gas pedal and suspension deflection. The model may additionally or alternatively give the relation between longitudinal acceleration and suspension deflection. The model may additionally provide the suspension deflection as a function of the steering angle and of the lateral acceleration for the passive suspension without negative stiffness. The model of the feed forward module may alternatively consist of a lookup table providing the relation between the sensor measurements 516 and suspension deflection. Feed forward module 518 determines a suspension deflection based on the input sensor measurements 516 from sensor system 510 and estimates a desired trimmed state 520 based on the determined suspension deflection. Desired trim state 520 is compared with an actual trim state 550 at point 522 based on a measured actual trim deflection 542. Compared trim state 523 is then input into trimming control system 524. Using position control and force control the trimming control system 524 determines the signal input 526 for active trimming mechanism 534 that will achieve a new trimmed position of the negative stiffness element 530 under load 548. This is achieved by moving pivot points 537 vertically within range 535. Active trimming mechanism 534 may be a linear or rotational actuator and may comprise any actuator including electric, hydraulic. The active trimming mechanism moves the pivot points 537 of the negative stiffness element 530 relative to the positive spring 552 in either vertical direction 535 relative to the positive spring 552. The exemplary feed-forward control of the active trimming mechanism results in decoupling ride and handling. Accordingly the improved ride performance is achieved by the inclusion of the negative stiffness element, while the desired handling performance of a passive suspension system without the negative stiffness element can also be achieved.

Figure 6:
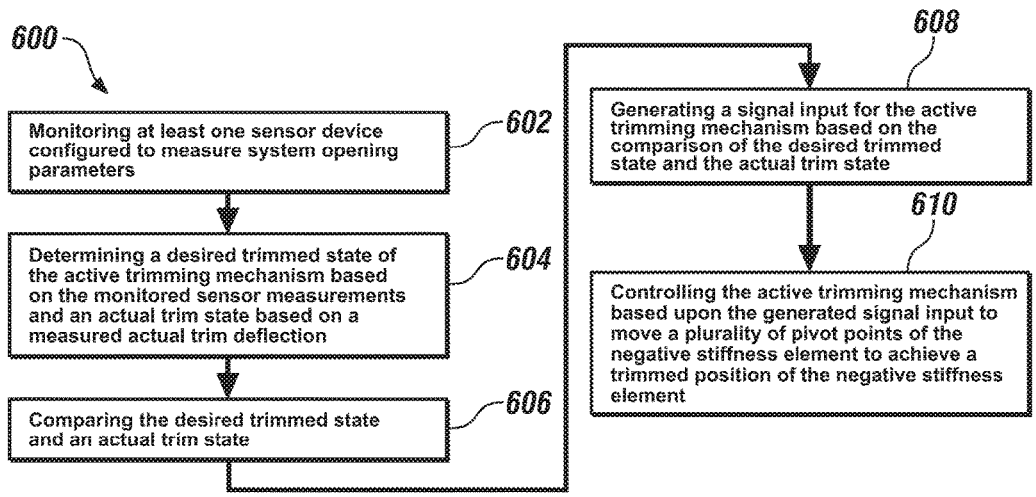
FIG. 6 shows a flow diagram of an exemplary process of feed forward control of an active trimming mechanism in a suspension system having active dynamic trimming, in accordance with the present disclosure.

FIG. 6 depicts an exemplary process of feed forward control of an active trimming mechanism in a suspension system having active dynamic trimming, as depicted in FIG. 5. Table 1 is provided as a key wherein the numerically labeled blocks and the corresponding functions are set forth as follows.

TABLE 1

| BLOCK | BLOCK CONTENTS |
| --- | --- |
| 602 | Monitoring at least one sensor device configured to measure system operating parameters |
| 604 | Determining a desired trimmed state of the active trimming mechanism based on the monitored sensor measurements and an actual trim state based on a measured actual trim deflection |
| 606 | Comparing the desired trimmed state and an actual trim state |
| 608 | Generating a signal input for the active trimming mechanism based on the comparison of the desired trimmed state and the actual trim state |
| 610 | Controlling the active trimming mechanism based upon the generated signal input to move a plurality of pivot points of the negative stiffness element to achieve a trimmed position of the negative stiffness element |

Figure 7:
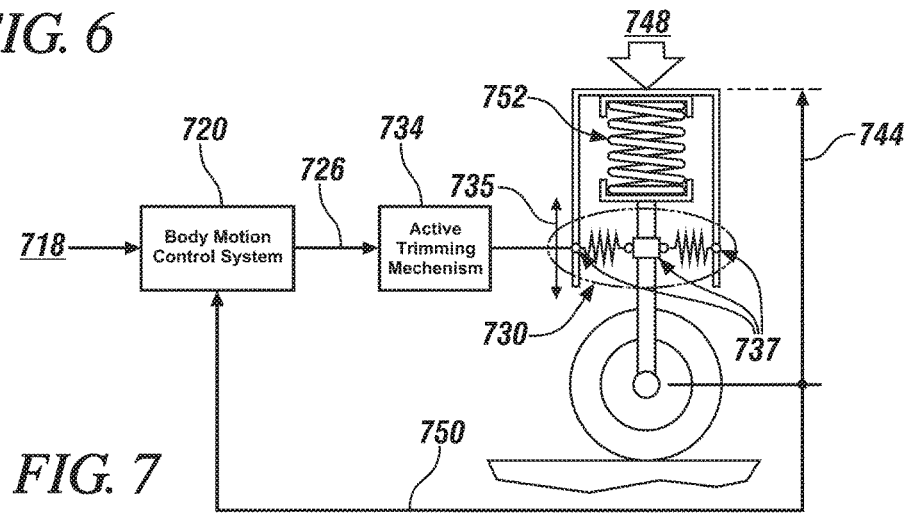
FIG. 7 illustrates an exemplary control system including feedback control of an active trimming mechanism in a suspension system having active dynamic trimming, in accordance with the disclosure.

FIG. 7 illustrates an exemplary control system including feedback control of an active trimming mechanism 734 in a suspension system having active dynamic trimming A desired suspension state 718, defined by acceleration, velocity and deflection of the suspension, is input into a body motion control system 720. Additionally, an actual suspension state, defined by acceleration, velocity and deflection of the suspension, is determined based on the actual suspension deflection 744 and is input as feedback into the body motion control system 720. The body motion control system may use any known method, including linear-quadratic-Gaussian (LQG) control, to establish an optimal feedback command signal 726 to the active trimming mechanism 734 that moves the trimming points 737 in an optimal manner for achieving best performance. Active trimming mechanism 734 may be a linear or rotational actuator and may comprise any actuator including electric, hydraulic. The active trimming mechanism moves the pivot points 737 of the negative stiffness element 730 relative to the positive spring 752 in either vertical direction 735 relative to the positive spring 752.

This feedback control method may be used as an alternative to the feed forward control method of FIG. 4, or it may be used in addition to the feed forward control method. In an exemplary embodiment the feedback control method of the active trimming mechanism does not require the determination of the actual trimmed state 550 or the trimming position control 524.

FIG. 8 graphically depicts the heave 804, roll 806 and pitch 808 during braking of a vehicle having passive suspension with no negative stiffness element 812, a vehicle having passive suspension with a negative stiffness element without active trimming 814, and a vehicle having passive suspension with a negative stiffness element and active trimming 816. For each of the graphs 801, 802 and 803 the vehicle brakes at time 2 seconds with an acceleration of 1.8 m/s$^2$. Graph 801 depicts the heave in meters 804 over time in seconds 810 of each of a vehicle having passive suspension with no negative stiffness element 812, a vehicle having passive suspension with a negative stiffness element without active trimming 814, and a vehicle having passive suspension with a negative stiffness element and active trimming 816. Graph 802 depicts the roll in degrees 806 over time in seconds 810 of each of a vehicle having passive suspension with no negative stiffness element 812, a vehicle having passive suspension with a negative stiffness element without active trimming 814, and a vehicle having passive suspension with a negative stiffness element and active trimming 816. Active trimming 816 is achieved using both feed-forward and feedback control in this exemplary embodiment. Graph 803 depicts the pitch in degrees 808 over time in seconds 810 of each of a vehicle having passive suspension with no negative stiffness element 812, a vehicle having passive suspension with a negative stiffness element without active trimming 814, and a vehicle having passive suspension with a negative stiffness element and active trimming 816. Graph 803 clearly illustrates that pitch 808 of a braking vehicle having a negative stiffness element and active trimming 816 can be significantly smaller than a vehicle having no active trimming or negative stiffness element.

FIG. 9 graphically depicts trimming control simulation results of an active dynamic trimming system using closed loop control with a 5 Hz actuator. Each graph of FIG. 9 includes a plot line for each of a vehicle having passive suspension with no negative stiffness element 901, a vehicle having passive suspension with a negative stiffness element without active trimming 902, and a vehicle having passive suspension with a negative stiffness element and active trimming with a 5 Hz actuator 903. Graph 910 depicts heave acceleration 912 in gravitational-force (g) as a function of time 911 in seconds. Graph 920 depicts roll 922 in degrees as a function of time 921 in seconds. Graph 930 depicts pitch 932 in degrees as a function of time 931 in seconds. The pitch of the vehicle having passive suspension with a negative stiffness element and active trimming with a 5 Hz actuator 903 is shown to experience less drastic changes than the vehicles without active trimming control 901 and 902. Graph 940 depicts heave acceleration 942 in gravitational-force (g) as a function of frequency 941 in Hertz (Hz). As can be seen with respect to plots 901, 902, 903 lower resonance results in an improved ride (reduced heave acceleration). Plot 903 of the vehicle having passive suspension with a negative stiffness element and active trimming with a 5 Hz actuator is further shown to have reduced heave acceleration than the vehicles without active trimming control, plots 901 and 902. Graph 950 depicts roll rate 952 in degrees/second as a function of frequency 951 in Hertz. Due to the presence of the anti-roll bar the vehicle having a negative stiffness element 902 does not demonstrate significant improvement over the vehicle having neither active trimming control nor negative stiffness 901. However, with active trimming control and negative stiffness 903 the roll rate is reduced. Graph 960 depicts pitch rate 962 in degrees/second as a function of frequency 961 in Hertz. Graph 970 depicts heave 972 in meters as a function of time 971 in seconds.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A suspension assembly between a sprung element and an unsprung element, comprising:
   a load-carrying spring and a negative stiffness element between the sprung element and the unsprung element;
   the load-carrying spring element configured with a positive spring rate to support a static load of the sprung element;
   the negative stiffness element configured with a negative spring rate and configured to exert a force opposing the spring rate of the spring, said negative spring rate having a magnitude that cancels the positive spring rate at a zero deflection point of the suspension assembly; and
   an active trimming mechanism, including a control module, configured to move a plurality of pivot points of the negative stiffness element to achieve a trimmed position of the negative stiffness element.

2. The suspension assembly of claim 1, wherein said negative spring rate having a magnitude that cancels the positive spring rate at a zero deflection point of the suspension assembly comprises the negative spring rate having a magnitude that fully cancels the positive spring rate at a zero deflection point of the suspension assembly.

3. The suspension assembly of claim 1, wherein said negative spring rate having a magnitude that cancels the positive spring rate at a zero deflection point of the suspension assembly comprises the negative spring rate having a magnitude that partially cancels the positive spring rate at a zero deflection point of the suspension assembly.

4. The suspension assembly of claim 1, wherein the negative stiffness element comprises a tension spring and linkage assemblies configured to generate an separating force on the sprung element relative to the unsprung element.

5. The suspension assembly of claim 1, wherein the active trimming mechanism is configured to move the plurality of pivot points of the negative stiffness element to achieve a trimmed position of the negative stiffness element based on a change in at least one of the static load of the sprung element and a dynamic load of the sprung element.

6. The suspension assembly of claim 1, wherein the active trimming mechanism comprises at least one actuator configured to move the pivot points of the negative stiffness element to achieve a trimmed position of the negative stiffness element.

7. The suspension assembly of claim 6, wherein the at least one actuator comprises an electric linear actuator.

8. The suspension assembly of claim 6, wherein the at least one actuator comprises a rotational actuator.

9. The suspension assembly of claim 5, wherein the active trimming mechanism comprises at least one sensor device configured to determine the static load of the sprung element and the dynamic load of the sprung element.

10. The suspension assembly of claim 6, wherein the at least one actuator comprises a hydraulic linear actuator.

11. A method for controlling a suspension assembly between a sprung element and an unsprung element, the suspension assembly including a negative stiffness element, an active trimming mechanism, and a control module, comprising:
    monitoring at least one sensor device configured to measure system operating parameters;
    determining a desired trim state of the active trimming mechanism based on the measured system operating parameters;
    determining an actual trim state based on a measured actual trim deflection;
    comparing the desired trim state to the actual trim state;
    generating a signal input for the active trimming mechanism based on the comparison of the desired trim state to the actual trim state; and
    controlling the active trimming mechanism based upon the generated signal input to move a plurality of pivot points of the negative stiffness element to achieve a trimmed position of the negative stiffness element; and
    operating the negative stiffness element in a trimmed position.

12. The method of claim 11, wherein monitoring at least one sensor device configured to measure system operating parameters comprises monitoring a brake pedal sensor, a gas pedal sensor, a steering angle sensor and an acceleration sensor.

13. The method of claim 11, wherein determining a desired trim state of the active trimming mechanism based on the measured system operating parameters comprises using a model configured to estimate a suspension deflection based on the measured system operating parameters.

14. The method of claim 11, wherein determining a desired trim state of the active trimming mechanism based on the measured system operating parameters comprises using a look up table configured to estimate a suspension deflection based on the measured system operating parameters.

15. The method of claim 11 further comprising:
    determining a desired suspension state based on the measured system operating parameters;
    monitoring an actual suspension deflection;
    determine an actual suspension state based on the monitored actual suspension deflection;
    generating an optimal feedback command signal for the active trimming mechanism based on the determined desired suspension state and the determined actual suspension state; and
    controlling the active trimming mechanism based upon the generated signal input and the optimal feedback command to move a plurality of pivot points of the negative stiffness element to achieve the trimmed position of the negative stiffness element.

16. The method of claim 15, wherein generating an optimal feedback command signal for the active trimming mechanism based on the determined desired suspension state and the determined actual suspension state comprises using linear-quadratic-Gaussian (LQG) control methods.

17. An apparatus for controlling a suspension assembly between a sprung element and an unsprung element comprising:
    a load-carrying spring and a negative stiffness element between the sprung element and the unsprung element;
    the load-carrying spring configured with a positive spring rate to support a static load of the sprung element;
    the negative stiffness element configured with a negative spring rate and configured to exert a force opposing the spring rate of the spring, said negative spring rate having a magnitude that cancels the positive spring rate at a zero deflection point of the suspension assembly;
    an active trimming mechanism configured move a plurality of pivot points of the negative stiffness element to achieve a trimmed position of the negative stiffness element;

at least one sensor device configured to measure system operating parameters and provided to an active trimming mechanism control module; and the active trimming mechanism control module configured to execute a routine comprising the following steps:
monitor the at least one sensor device configured to measure system operating parameters;
determine a desired trim state of the active trimming mechanism based on the monitored sensor measurements;
determine an actual trim state based on a measured actual trim deflection;
compare the desired trim state to the actual trim state;
generate a signal input for the active trimming mechanism based on the comparison of the desired trim state to the actual trim state; and
control the active trimming mechanism based upon the generated signal input to move a plurality of pivot points of the negative stiffness element to achieve a trimmed position of the negative stiffness element.

18. The apparatus of claim 17, wherein the routine executed by the active trimming mechanism control module further comprises the following steps:
determine a desired suspension state based on the measured system operating parameters;
monitor an actual suspension deflection;
determine an actual suspension state based on the monitored actual suspension deflection;
generate an optimal feedback command signal for the active trimming mechanism based on the determined desired suspension state and the determined actual suspension state; and
control the active trimming mechanism based upon the generated signal input and the optimal feedback command to move a plurality of pivot points of the negative stiffness element to achieve the trimmed position of the negative stiffness element.

19. The apparatus of claim 17, wherein the routine step to move the plurality of pivot points of the negative stiffness element to achieve the trimmed position of the negative stiffness element is further based on a change in at least one of the static load of the sprung element and a dynamic load of the sprung element.

20. The apparatus of claim 17, wherein the active trimming mechanism comprises at least one actuator configured to move the pivot points of the negative stiffness element to achieve the trimmed position of the negative stiffness element.

* * * * *